United States Patent [19]

Schade

[11] Patent Number: 4,773,999

[45] Date of Patent: Sep. 27, 1988

[54] PLURAL ANNULAR ROLLS OF WOUND MEDIUM

[76] Inventor: Harvey R. Schade, 303 High St., P.O. Box 269, Edgerton, Wis. 53534

[21] Appl. No.: 924,894

[22] Filed: Oct. 30, 1986

[51] Int. Cl.[4] .............................................. B01D 27/04
[52] U.S. Cl. .................................... 210/315; 210/489; 210/497.1
[58] Field of Search ............... 210/437, 438, 439, 488, 210/489, 497.1, 508, 314, 315, 316, D13; 55/482, 485, 520, 527

[56] References Cited

U.S. PATENT DOCUMENTS

| | | | |
|---|---|---|---|
| 1,860,778 | 5/1932 | Howard | 55/485 |
| 2,076,935 | 4/1937 | Burckhalter | 210/DIG. 13 |
| 2,598,673 | 6/1952 | Brixius et al. | 55/485 |
| 3,092,577 | 6/1963 | Sather | 210/488 |
| 4,017,400 | 4/1977 | Schade | 210/439 |
| 4,366,057 | 12/1982 | Bridges et al. | 210/437 |
| 4,579,657 | 4/1986 | Hood, Jr. | 210/439 |

Primary Examiner—Peter Hruskoci
Assistant Examiner—Wanda L. Millard
Attorney, Agent, or Firm—Keith Schoff

[57] ABSTRACT

Filtering apparatus comprising two rolls of wound tissue axially stacked with a discharge gallery separating them for receiving flow entering from the outboard ends of the stack is provided with an improvement for sealing the discharge gallery from short circuited flow entering it by placing tissue windings in overlapping arrangement with the periphery of the rolls to cover at least partially circumferential faces of the rolls and isolate the discharge gallery effectively without the use of sealing material dissimilar from the filtering medium.

3 Claims, 1 Drawing Sheet

PLURAL ANNULAR ROLLS OF WOUND MEDIUM

BACKGROUND OF THE INVENTION

Wound tissue rolls for filtering both aqueous and oil base liquids may be arranged in spaced apart, axial alignment within a sealed enclosure with both inner and outer peripheral seals being provided for the interfacing space between rolls to render it an isolated overflow gallery for liquid which enters the outboard end faces of the rolls and flows axially through the interstices between tissue layers comprising the rolls. The outflow gallery may conveniently be ported to a core tube disposed through the annular rolls, and against which the rolls are tightly pressed by pressure differential which exists between the supply liquid inflow stream and the filtered liquid discharge stream. Provision of an effective seal about the outer periphery of the outflow gallery is especially problematic because the configuration of the wound tissue rolls tends to distort under the effects of the differential pressure and the rolls tend to be compressed so as to pull away from less comformable sealing means, whereas the use of flexible sealants and gasket means typically introduce materials of compositions which may react chemically with the filter medium or liquid being filtered.

PRIOR ART

Shade U.S. Pat. No. 4,017,400 provides a mechanical seal configured as an annular flange disposed between leaves of filter roll tissue near the outer peripheral extremity, and Bridges et al. U.S. Pat. No. 4,366,057 discloses a rubber-like bend overlapping the peripheral surfaces of a portion of the filter rolls and enclosing the outer periphery of the discharge gallery between rolls.

SUMMARY OF THE INVENTION

An axial flow, two-element, wound tissue medium, filter assembly is provided which is effective to prevent both channeling flow of liquid within the filter elements and by-pass flow between filter elements, and which does not introduce additional compositions into the filter assembly thereby to avoid possible chemical or physical interactions which could deleteriously affect the filter medium or contaminate the filter liquid. A seal is provided between filter elements by wrappings of filter medium tissue being applied around the outer peripheral surfaces of the elements to at least partially encase such surfaces and completely overlap the space between the elements which comprises the filtrate overflow gallery. The wrappings conform in the same manner as the filter elements to the effects of pressure differential between the inflow and outflow streams of liquid being filtered insuring that a tight seal is maintained and that undesirable physical or chemical changes do not take place in the filter assembly because of the means used to seal the outflow gallery between filter elements. In addition, fabrication of the filter assembly is simplified and tolerances for mechanical dimensions and chemical reactivity of sealants are eliminated from consideration.

DESCRIPTION OF THE INVENTION

Figure 1:
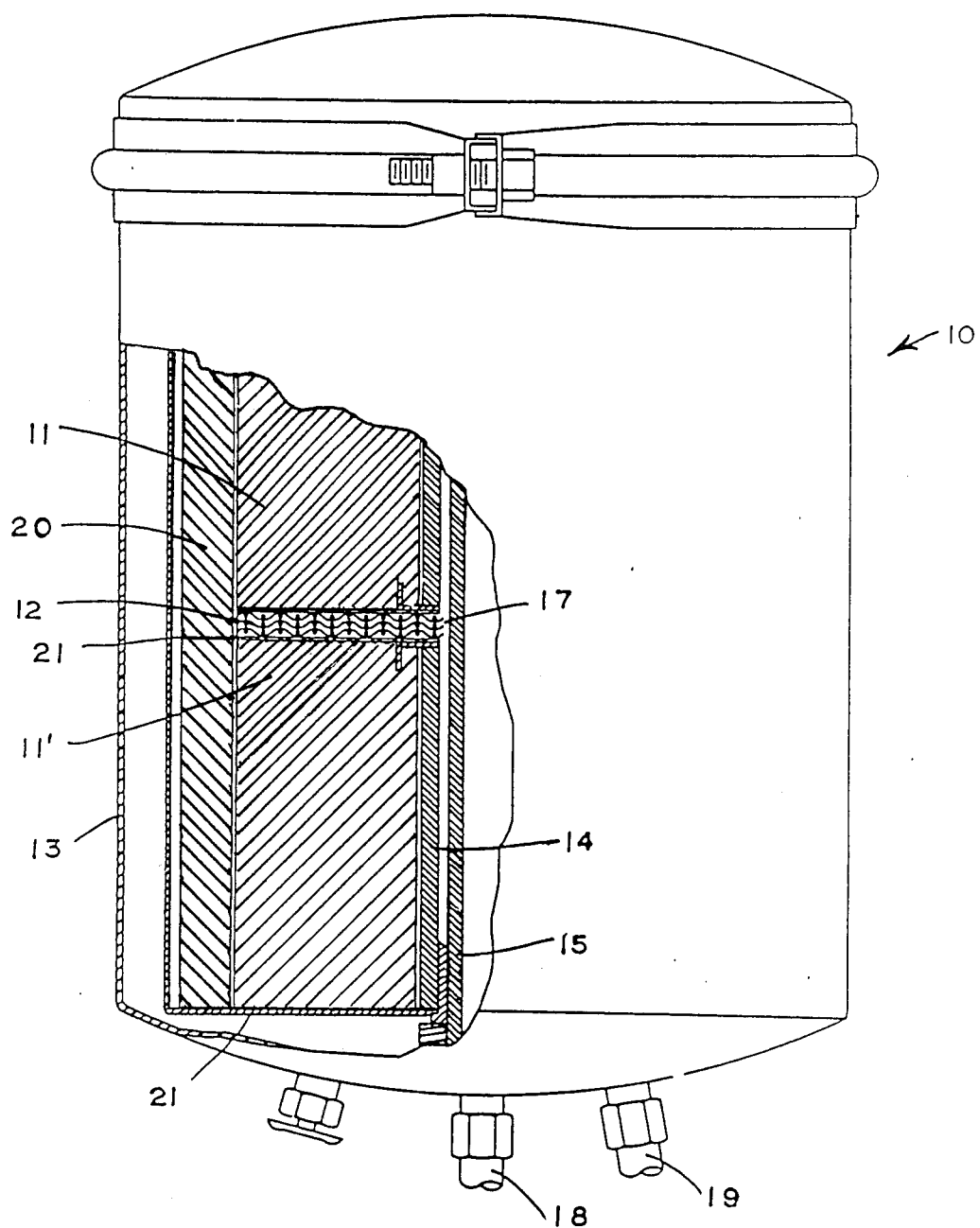
FIG. 1 is a side elevation in partial section of a preferred embodiment of a filter assembly of this invention.

Referring to the figures, dual element filter assembly 10 comprises identical wound tissue medium, annular roll elements 11, 11' disposed as shown in axial alignment and separated by screen 12 interposed between the inboard ends of the two rolls. Sealed housing 13 encloses elements 11, 11' which are disposed with core tube 14 passing through the central bores thereof and making a tight seal therewith. A mechanical or resilient seal may also be provided at either end of roll elements 11, 11' or a friction fit may be provided between the roll elements and the tube, or other conventional means may be provided to prevent by-pass flow from reaching outflow collection gallery 17 between the inboard ends of roll elements 11, 11'. The inner peripheral seal between elements 11, 11' and the core tube tends to be enchanced both by swelling of the filter medium when wetted by the filter liquid and by differential pressure across the filter medium, the effect of which is to compress the roll elements both in axial and radial directions and more tightly compress the elements against the core tube. Port 15 in tube 14 communicates the interior of the tube to collection gallery 17 for enabling filtrate to flow from filter assembly 10 through core tube 14 and discharge stream fitting 18. Woven wire screen 12 is provided in collection gallery 17 between roll elements 11, 11' to maintain separation between the rolls against the pressure exerted on the outboard ends of the rolls which acts to force the rolls together.

Unfiltered, circulated liquid enters housing 13 of filter assembly 10 through fitting 19 and envelops both filter elements 11, 11' within the housing. With the pore size of the filter medium being significantly smaller than the interstices between wound layers of the filter medium tissue comprising the rolls, liquid is caused to traverse the filter elements in an axial direction moving from the outboard ends of elements 11, 11' toward the inboard ends and into collection gallery 17. To insure against unrestrained channeling flow being effective to by-pass the filtering elements, discs 21 of filter medium tissue are placed against the inboard end faces of each element 11, 11' to provide pads which initially impede short circuited flow and rapidly accumulate residue deposit where contacted by unfiltered liquid to effectively block by-passing flow if channeling within the filter elements would occur. The above described apparatus is conventional and comprises no part of this invention.

Wound about each roll element 11, 11' are tissue medium layers 20, preferably of the same composition as that of elements 11, 11', which bridge completely across the thickness dimension of gallery 17 separation between elements 11, 11' and encase at least a portion of the outer peripheral surfaces of elements 11, 11', although the entire extent of such surfaces may be enclosed, rendering the assembly of components within housing 13 annularly cylindrical for ease of insertion and removal from the cannister to minimize the possibility of misalignment in a manner which could restrict proper circulation of fluid within the cannister. Housing 13 can be opened and resealed in the embodiment shown, but may comprise a permanently sealed disposable cartridge, if desired. As many layers of tissue as desired may be provided, but preferably at least eight or more layers 20 are provided which extend not appreciably less than at least substantially half of the width of the peripheral face of each element 11, 11' to effectively seal and isolate gallery 17 from contaminating short circuited flow of unfiltered liquid. Although sealant or adhesive may be provided on layers 20, such use is not preferred, with the character of layers 20 being essentially identical to that of the windings of elements 11, 11' and compression undergone in response to differential pressure across the layers of tissue being sufficient to effect and maintain integrity of seal between elements 11, 11' and layer 20 wrappings. Core seals are provided for elements 11, 11' by provision of annular "T" washiners 16 being provided at the outboard face of each element as shown for element 11'. In a non-preferred embodiment, a material of different porosity or fiber composition from that of elements 11, 11' may be provided for layers 20, however, cellulose fiber is preferred for the filter tissue medium and wrappings 20, the cellulose pulp being felted for the tissue medium with interstices of proper permeability for use with a given fluid and with core tube 14 being impermeable.

I claim:

1. In a liquid filtering apparatus configured with a sealed housing having an inflow fitting which communicates the confines of said housing to external environment and with an internally disposed tube which extends axially upstanding from a wall of said housing and is sealed to said housing at a terminal extremity thereof and wherein said tube is ported to the confines of said housing, and to external environs at at least one end thereof by means of an outflow fitting, and wherein a plurality of annular rolls of wound tissue medium are co-axially disposed about said tube within said housing and are maintained in spaced apart end-separated relation by interposition of spacer means therebetween which provide outflow channel gallery means, an improvement for isolating said gallery from short circuiting flow by use of non-reactive means comprising multiple layers of fibrous, porous tissue medium disposed as windings of sheet material thereof layered immediately adjacent the outer peripheral surfaces of said rolls completely overlapping said outflow channel gallery and at least partially overlapping said outer peripheral surfaces of each said roll.

2. The apparatus of claim 1 wherein said windings of tissue medium comprise celluslosic fiber tissue.

3. The apparatus of claim 1 wherein said windings of tissue medium completely overlap each said tissue roll outer peripheral surface.

* * * * *